United States Patent
Finck

(10) Patent No.: US 9,411,040 B2
(45) Date of Patent: Aug. 9, 2016

(54) SYSTEMS AND METHODS FOR ACOUSTIC WINDOWS

(71) Applicant: GOODRICH CORPORATION, Charlotte, NC (US)

(72) Inventor: Darren G. Finck, Jacksonville, FL (US)

(73) Assignee: GOODRICH CORPORATION, Charlotte, NC (US)

( * ) Notice: Subject to any disclaimer, the term of this patent is extended or adjusted under 35 U.S.C. 154(b) by 32 days.

(21) Appl. No.: 14/312,176

(22) Filed: Jun. 23, 2014

(65) Prior Publication Data

US 2015/0369907 A1   Dec. 24, 2015

(51) Int. Cl.
| | |
|---|---|
| *B06B 3/04* | (2006.01) |
| *G01S 7/521* | (2006.01) |
| *G10K 11/00* | (2006.01) |
| *G10K 11/02* | (2006.01) |
| *B06B 3/00* | (2006.01) |

(52) U.S. Cl.
CPC ............ *G01S 7/521* (2013.01); *G10K 11/006* (2013.01); *G10K 11/02* (2013.01); *Y10T 29/49828* (2015.01)

(58) Field of Classification Search
USPC ............. 181/290, 289, 294, 284, 402, 198; 367/152, 191, 176
See application file for complete search history.

(56) References Cited

U.S. PATENT DOCUMENTS

| | | | | | |
|---|---|---|---|---|---|
| 2,430,013 A | * | 11/1947 | Hansell | ................. | G10K 11/02 181/402 |
| 2,444,911 A | * | 7/1948 | Benioff | ................. | G10K 11/004 181/198 |
| 2,960,175 A | * | 11/1960 | McMillan | ................. | E04B 1/82 181/198 |
| 3,038,551 A | * | 6/1962 | McCoy | ................. | G10K 11/004 181/198 |
| 3,120,875 A | * | 2/1964 | Graner | ................. | G10K 11/004 181/198 |
| 3,123,176 A | * | 3/1964 | Greenberg | ........... | G10K 11/004 181/198 |
| 3,687,219 A | * | 8/1972 | Langlois | ................ | G10K 11/30 181/176 |
| 3,718,032 A | * | 2/1973 | Gray | ..................... | G01N 29/06 367/152 |
| 3,858,165 A | * | 12/1974 | Pegg | ..................... | G10K 11/006 181/402 |
| 4,016,530 A | * | 4/1977 | Goll | ...................... | G10K 11/02 181/402 |
| 4,062,422 A | * | 12/1977 | Phelps, Jr. | ............. | G10K 11/02 181/198 |
| 4,770,267 A | * | 9/1988 | Hauser | ................. | G10K 11/006 181/0.5 |
| 4,784,898 A | * | 11/1988 | Raghava | ................. | B29C 70/08 428/408 |
| 4,821,243 A | * | 4/1989 | Caprette, Jr. | ......... | G10K 11/205 181/198 |
| 4,997,705 A | | 3/1991 | Caprette, Jr. et al. | | |
| 5,175,709 A | * | 12/1992 | Slayton | ................ | G10K 11/002 310/326 |
| 5,276,658 A | * | 1/1994 | Bullat | .................... | G10K 11/02 367/173 |

(Continued)

OTHER PUBLICATIONS

Extended European Search Report dated Oct. 26, 2015 in European Application No. 15172073.7.

*Primary Examiner* — Edgardo San Martin
(74) *Attorney, Agent, or Firm* — Snell & Wilmer L.L.P.

(57) ABSTRACT

Systems and methods for acoustic windows are disclosed. An acoustic window may include a structural core and a non-structural tuning layer. The structural core may include a carbon reinforced composite, and the non-structural tuning layer may include an epoxy. The structural core may have local minima for insertion loss. The epoxy may increase a bandwidth about the minima of frequencies which are subject to relatively low insertion loss.

12 Claims, 3 Drawing Sheets

(56) References Cited

U.S. PATENT DOCUMENTS

| | | | |
|---|---|---|---|
| 5,735,282 A * | 4/1998 | Hossack | A61B 8/12 600/458 |
| 6,774,639 B1 * | 8/2004 | Unsworth | G01R 31/1227 324/535 |
| 6,831,876 B1 | 12/2004 | Cartwright | |
| 7,408,842 B2 * | 8/2008 | Caiazzo | G10K 11/02 181/198 |
| 7,564,172 B1 * | 7/2009 | Huang | B06B 1/0292 310/311 |
| 9,061,128 B2 * | 6/2015 | Hall | A61N 1/0432 |
| 9,221,077 B2 * | 12/2015 | Chen | B06B 1/0292 |
| 2013/0301394 A1 * | 11/2013 | Chen | B06B 1/0292 367/155 |

\* cited by examiner

SYSTEMS AND METHODS FOR ACOUSTIC WINDOWS

FIELD

The technical field relates to acoustic windows, and more particularly, relates to sonar windows for sonar domes.

BACKGROUND

Acoustic windows such as sonar domes for use in transmitting or receiving acoustic waveform signals in a liquid environment are well known in the art. Typically, the exterior surface of such windows is exposed to a body of free liquid such as an ocean, lake, or tank. The interior surface of such windows conventionally has an at least partially defined chamber filled with water or other liquid. Factors such as structural integrity and insertion loss (the amount of acoustic signal attenuation of sound waves passing through the acoustic window) are considered when constructing acoustic windows. Typical acoustic windows comprising a relatively soft inner core and structural outer skins, or a single layer of essentially homogenous material, generally operate well at lower frequencies, but have significant insertion loss as frequencies increase.

SUMMARY

An acoustic window is disclosed. The acoustic window may comprise a structural core comprising a rigid material and a non-structural tuning layer coupled to the structural core.

In various embodiments, the structural core may comprise a composite laminate. The non-structural tuning layer may comprise an un-reinforced epoxy. An acoustic impedance of the structural core may be greater than an acoustic impedance of the non-structural tuning layer. The acoustic impedance of the non-structural tuning layer may be greater than the acoustic impedance of water. A thickness of the structural core may be equal to a multiple of one-half wavelength of a sound wave within the structural core for a particular frequency, and a thickness of the non-structural tuning layer may be equal to an odd multiple of one-quarter wavelength of a sound wave within the tuning layer for the particular frequency. The structural core may comprise a carbon fiber reinforced epoxy. The acoustic window may be configured to be a portion of a sonar dome.

A method of designing an acoustic window is disclosed. The method may comprise determining a desired frequency range. Properties for a structural core may be selected such that a local insertion loss minima is located within the desired frequency range. Properties for a tuning layer may be selected such that insertion loss is decreased within the desired frequency range. The tuning layer may be coupled to the structural core.

In various embodiments, the properties for the structural core comprise at least one of thickness, material, density, bulk modulus, Young's modulus, shear modulus, or acoustic impedance. A thickness of the structural core may be selected such that the thickness is approximately equal to a multiple of one-half wavelength of a sound wave in the structural core for a frequency within the desired frequency range. The structural core may comprise a carbon fiber reinforced composite. The tuning layer may comprise an epoxy. A thickness of the tuning layer may be selected to be an odd multiple of one-quarter wavelength of a sound wave in the tuning layer far a frequency within the desired frequency range. An acoustic impedance of the structural core may be greater than an acoustic impedance of the tuning layer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
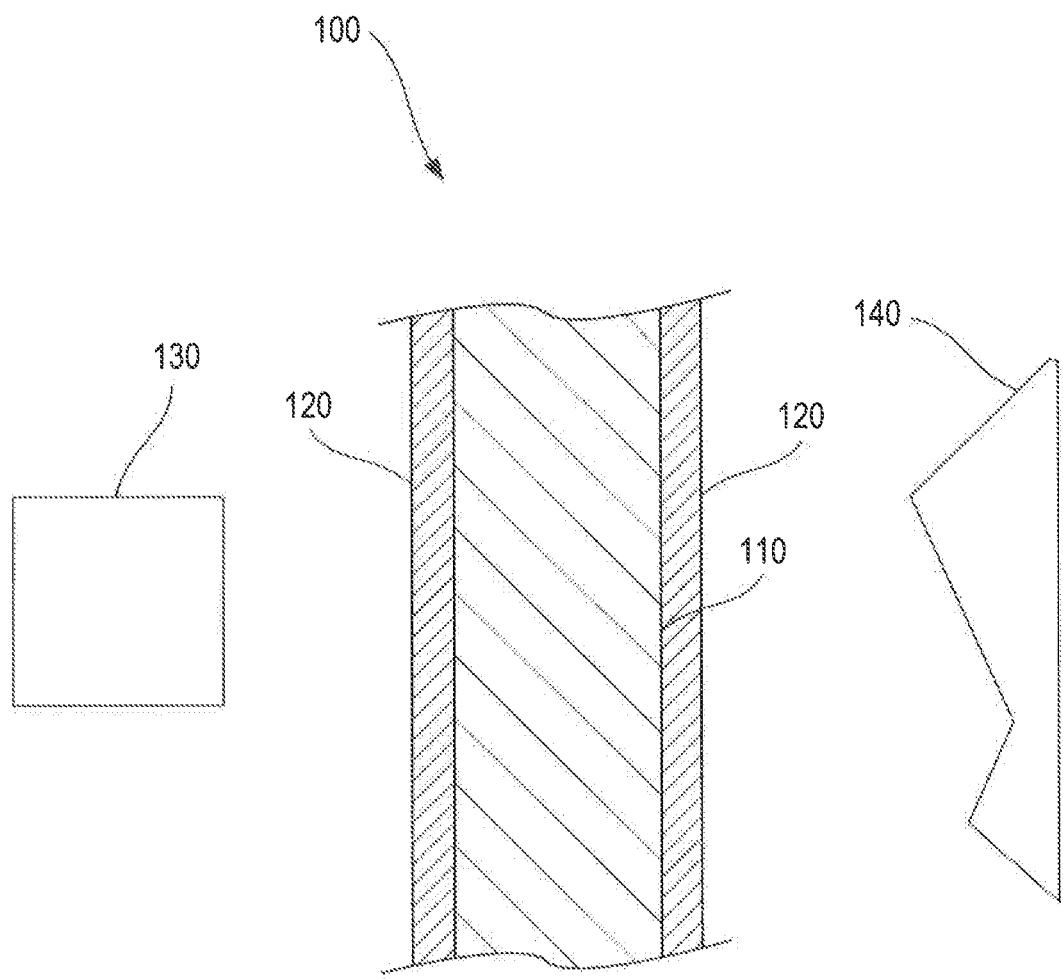
FIG. 1 illustrates a cross-sectional view of an acoustic window in accordance with various embodiments of the disclosure.

Referring to FIG. 1, an acoustic window 100 is illustrated according to various embodiments. Acoustic window 100 may comprise a core 110 and tuning layers 120. Core 110 may provide structural properties to acoustic window 100. In various embodiments, core 110 may comprise a fiber reinforced material, such as a carbon reinforced epoxy or fiberglass. In various embodiments, core 110 may comprise a plurality of composite plies.

Tuning layers 120 may comprise a non-structural material. As used herein, "non-structural" refers to a material that has less structural integrity than a material of core 110. The structural integrity refers to the ability of the material to withstand a designed service load, and may be based on the mechanical properties of the material, such as at least one of toughness, strength, weight, hardness, or elasticity. For example, tuning layers 120 may comprise an un-reinforced epoxy. The tuning layers 120 may be bonded to core 110 by any method known in the art.

Acoustic window 100 may be used as a cover or barrier to protect ultrasonic or sonar equipment from the environment, such as seawater. For example, acoustic window 100 may protect a transducer 130. Transducer 130 may emit sound waves which travel though acoustic window 100, reflect off an object 140, and return to transducer 130 through acoustic window 100. Higher frequencies may allow transducer 130 to provide a greater resolution of object 140. Acoustic window 100 may be shaped into curved or dome shapes or may be used as a planar window.

Figure 2:
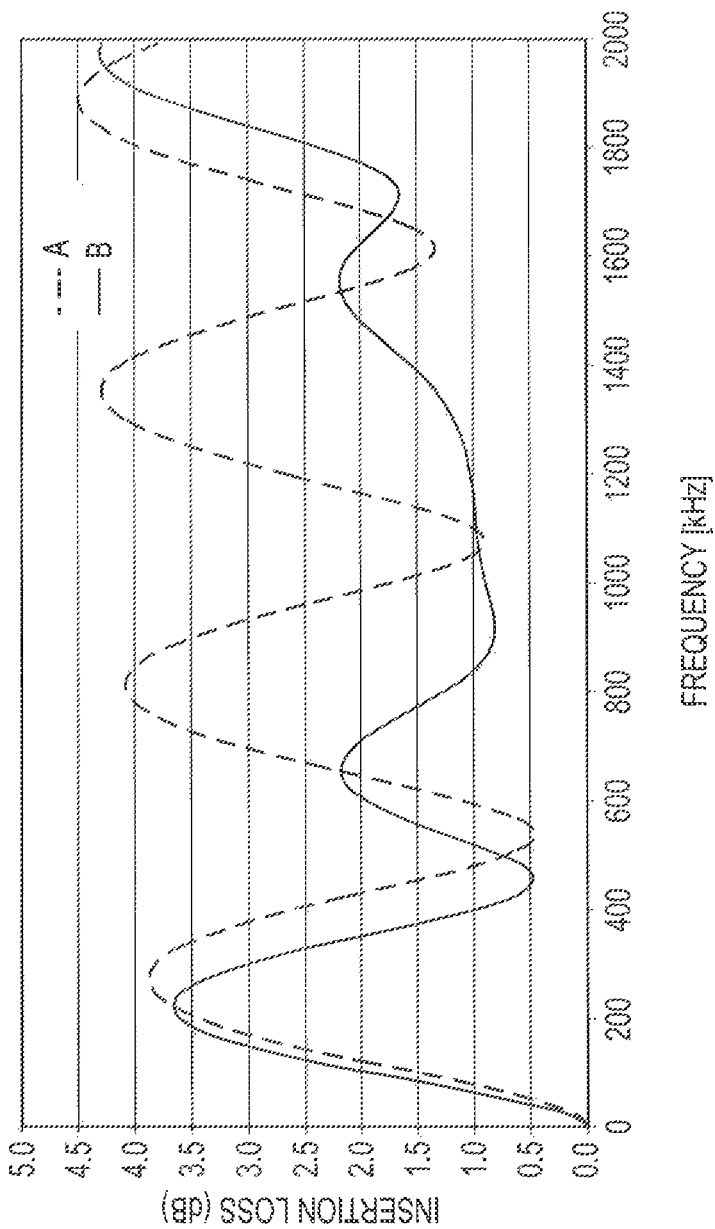
FIG. 2 illustrates a graph of the insertion loss versus frequency for multiple sample acoustic windows in accordance with various embodiments.

Referring to FIG. 2, a graph of insertion loss at normal incidence versus frequency is illustrated according to various embodiments. The graph represents a computer simulation of sound waves travelling though acoustic windows. The dashed line represents an acoustic window having a structural core without tuning layers (Sample A), and the solid line represents an acoustic window having a structural core with epoxy tuning layers (Sample B). In both cases, the structural core comprised seven composite plies assembled in a composite laminate. Each composite ply comprised high-strength carbon fibers in an epoxy. However, many types of fibers, such as glass, aramid, polyethylene, boron, and silicon carbide may be used in many types of matrix materials, such as polyimides, aluminum, titanium, and alumina. Similarly, many types of structural materials may be used for the structural core.

As the frequency increased, the amount of insertion loss for Sample A varied periodically. As illustrated, local minima were observed at approximately 540 kHz, 1080 kHz, and 1620 kHz. The sinusoid nature of the insertion loss is at least partially a function of the acoustic wavelength and a thickness of the structural core, insertion loss was lowest when a thickness of the core was a multiple of one-half wavelength of the sound waves in the material of the structural core. This may be at least partially due to constructive interference occurring within the structural core.

In the illustrated simulation, the core had a thickness of 14 millimeters (0.09 inches), and the speed of sound in the core was 2,600 meters/second (5800 miles per hour). The wavelength of sound waves in the core can be calculated by dividing the speed of sound by the frequency of the sound waves. Thus, at the local minimum of 1080 kHz, the wavelength is 2.4 mm (0.09 inches), and one-half of the wavelength is 1.2 mm (0.05 inches). Thus, the thickness of the core was a multiple of one-half of the wavelength of sound at 1080 kHz, specifically the multiple two, resulting in the local minimum at the desired frequency. Selecting materials with a particular bulk modulus, density, or thickness may allow for the structural core to have a local minimum at a desired frequency.

However, as is shown in FIG. 2, the bandwidth about the minima is very narrow. For example, at the 1080 kHz minimum, only frequencies from about 1000 kHz to 1150 kHz are below 1.5 dB of insertion loss for the structural core without tuning layers. Thus, a structural core without tuning layers would block a significant amount of sound outside of a narrow range of frequencies at the local minimum. Many sonars utilize a range of frequencies, and even small manufacturing tolerances in the thickness of the structural core can have a significant impact of the location of the minima. Thus, acoustic windows having a greater bandwidth of low insertion loss are desirable in many applications.

Sample B, represented by the solid line, shows the insertion loss versus frequency for the composite core of sample A, with a tuning layer on each side of the core. The tuning layers were comprised of epoxy and had a thickness of 0.51 mm (0.020 inches). However, a variety of materials may be used for the tuning layers, such as engineering plastics or elastomers.

In various embodiments, a thickness of each tuning layer may be an odd multiple of one-quarter wavelength of sound waves in the tuning layers for a desired frequency. For example, the wavelength of sound waves in the epoxy at 1080 kHz is about 2.0 mm (0.080 inches), and the thickness of the epoxy was equal to one quarter wavelength. However, the thickness may also be selected to be ¾ wavelength, 5/4 wavelength, etc. The effect of the tuning layers is observed in FIG. 2 as the decrease in insertion loss in the region of the local minimum at 1080 kHz. However, the range of frequencies affected by the tuning layers may be changed by selecting different thicknesses of the tuning layers. For example, the thickness of the tuning layers may be selected such that the thickness is equal to ¼ wavelength in the epoxy at 540 kHz in order to decrease insertion loss in the region of the first local minimum for the structural core.

The amount of insertion loss may be proportional to the difference in acoustic impedance between materials. For sound waves being transferred from a material with high acoustic impedance to a material with low acoustic impedance (or from low acoustic impedance to high acoustic impedance) a large amount of the energy of the sound waves may be reflected, resulting in high insertion loss. In various embodiments, the acoustic impedance of the tuning layers may be greater than the acoustic impedance of water, and less than the acoustic impedance of the structural core.

Figure 3:
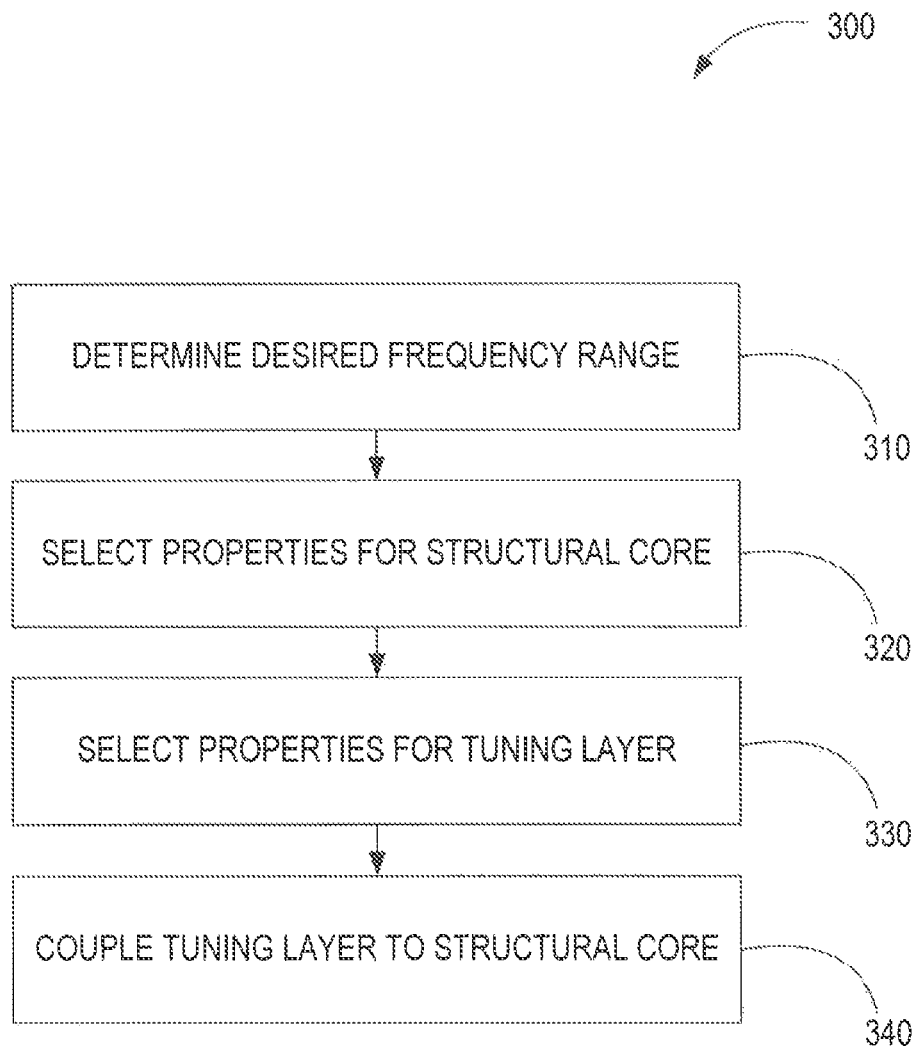
FIG. 3 illustrates a flowchart of a process for manufacturing an acoustic window in accordance with various embodiments.

Referring to FIG. 3, a flowchart of a process for designing and manufacturing an acoustic window is illustrated according to various embodiments. A desired frequency range may be determined (step 30), in various embodiments, the desired frequency range may be determined based on the specific application for a sonar device. For example, a particular sonar device may focus on frequencies between 800 kHz-1300 kHz. Properties for a structural core may be selected such that a local insertion loss minima is located within the desired frequency range (step 320). In various embodiments, the properties of the structural core may be selected such that the local insertion loss minima is at a center of the desired frequency range. The properties of the structural core to be selected may include at least one of thickness, material, density, bulk modulus, Young's modulus, shear modulus, or acoustic impedance, in various embodiments, the thickness may be selected to be a multiple of one-half wavelength of a sound wave in the structural core for a frequency within the desired frequency range.

Properties for a tuning layer may be selected such that insertion loss is decreased within the desired frequency range (step 330). The properties of the tuning layer to be selected may include at least one of thickness, material, density, bulk modulus, Young's modulus, shear modulus, or acoustic impedance. In various embodiments, the thickness may be selected to be an odd multiple of one-quarter wavelength of a sound wave in the tuning layer for a frequency within the desired frequency range. A material may be selected with an acoustic impedance close to the acoustic impedance of water, such as within a factor of 2, or within a factor of 4. The tuning layer may be coupled to the structural core (step 340). In various embodiments, a tuning layer may be coupled to each side of the structural core, in various embodiments, more than one tuning layer may be coupled to each side of the structural core.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant all(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as ethical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. An acoustic window comprising:
    a structural core comprising a composite ply, wherein a thickness of the structural core is equal to a multiple of one-half wavelength of a sound wave within the structural core for a particular frequency;
    a first non-structural tuning layer coupled to an exterior surface of the structural core, wherein a thickness of the first non-structural tuning layer is equal to an odd multiple of one-quarter wavelength of the sound wave within the first non-structural tuning layer for the particular frequency; and
    a second non-structural tuning layer coupled to an interior surface the structural core.

2. The acoustic window of claim 1, wherein the structural core comprises a composite laminate.

3. The acoustic window of claim 1, wherein the first non-structural tuning layer comprises an un-reinforced epoxy.

4. The acoustic window of claim 1, wherein an acoustic impedance of the structural core is greater than an acoustic impedance of the first non-structural tuning layer.

5. The acoustic window of claim 4, wherein the acoustic impedance of the first non-structural tuning layer is greater than an acoustic impedance of water.

6. The acoustic window of claim 1, wherein the structural core comprises a carbon fiber reinforced epoxy.

7. The acoustic window of claim 1, wherein the acoustic window is configured to be a portion of a sonar dome.

8. A method of designing an acoustic window comprising:
    determining a desired frequency range;
    selecting properties for a structural core such that a local insertion loss minima is located within the desired frequency range, wherein a thickness of the structural core is equal to a multiple of one-half wavelength of a sound wave within the structural core for a particular frequency within the desired frequency range;
    selecting properties for a first tuning layer and a second tuning layer such that insertion loss is decreased within the desired frequency range, wherein a thickness of the first tuning layer is equal to an odd multiple of one-quarter wavelength of the sound wave within the first tuning layer for the particular frequency;
    coupling the first tuning layer to an exterior surface of the structural core; and
    coupling the second tuning layer to an interior surface of the structural core.

9. The method of claim 8, wherein the properties for the structural core comprise at least one of thickness, material, density, bulk modulus, Young's modulus, shear modulus, or acoustic impedance.

10. The method of claim 8, wherein the structural core comprises a carbon fiber reinforced composite.

11. The method of claim 8, wherein the first tuning layer comprises an epoxy.

12. The method of claim 8, wherein an acoustic impedance of the structural core is greater than an acoustic impedance of the first tuning layer.

* * * * *